April 19, 1938. T. P. LOHRMAN 2,114,538
WINDOW CONSTRUCTION FOR VEHICLE BODIES
Filed Aug. 2, 1937

INVENTOR
Thomas Paul Lohrman

Patented Apr. 19, 1938

2,114,538

UNITED STATES PATENT OFFICE 2,114,538

WINDOW CONSTRUCTION FOR VEHICLE BODIES

Thomas Paul Lohrman, San Francisco, Calif.

Application August 2, 1937, Serial No. 156,970

2 Claims. (Cl. 296—44)

The invention relates to windows for vehicle bodies known as ventilating windows, and particularly to windows having pivotal mountings permitting the glass panels to swing in or out for ventilating purposes.

With the present type of ventilating windows in this class, it is the general rule to employ divided rubber sealing members, part of which lie outside of the plane of the window panel, and part inside. This division creates joints in the sealing members which are difficult to close sufficiently to make a weather-proof window. Also the portion which lies outside of the window panel is subjected to the sun's rays and weather conditions which cause deterioration and shorten the life of such sealing members. One of the objects of the present invention is to overcome these objectionable features.

Another object is to provide a window panel having its exterior surface substantially flush with the framework surrounding said window panel.

Still another object is to provide a ventilating window which requires little effort to operate.

The accomplishment of these objects as well as other improvements are attained through the employment of a one piece sealing member lying in the same plane as the window panel; this also permits the use of sponge rubber or other more resilient material than could be used with the conventional type of construction, thus affording a more easily manipulated mechanism.

The advantages of the present invention become apparent after a brief study of the following description in conjunction with the drawing which forms a part of this application, and in which.

Figure 1:
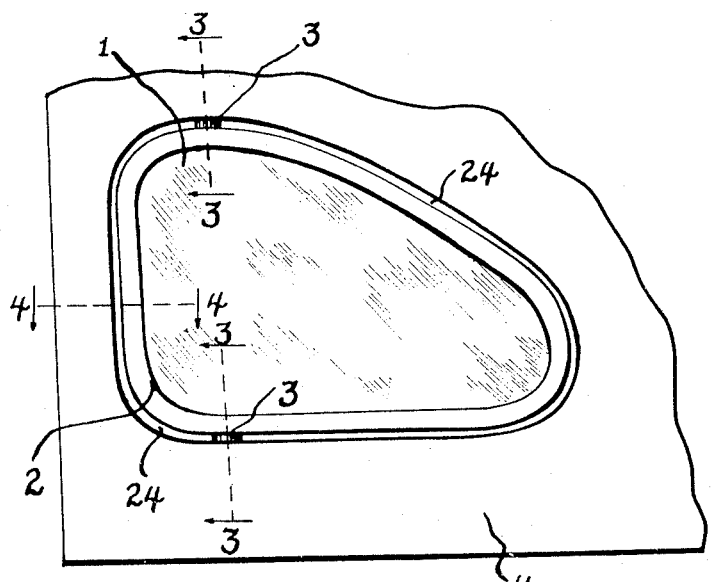
Fig. 1 is a fragmentary elevational view of a vehicle body panel showing a ventilating window.

As shown in the drawing, the glass panel 1 is mounted in a metal sash 2; metal sash 2 having pivots 3 secured thereto, which permit the glass panel 1 to swing in or out for ventilation purposes.

Figure 3:
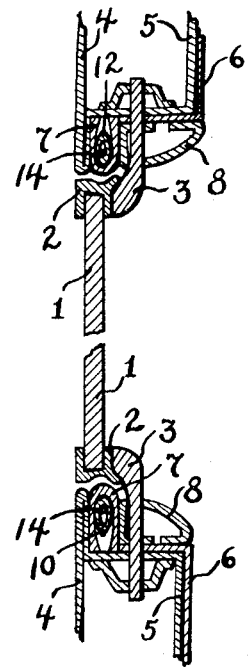
Fig. 3 is an enlarged cross-sectional view taken substantially on lines 3—3, of Fig. 1.
Figure 4:
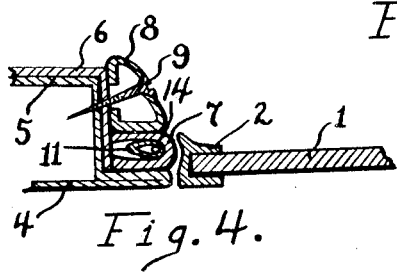
Fig. 4 is an enlarged cross-sectional view taken substantially on line 4—4 of Fig. 1.

The body panel 4 is made of sheet metal, its edge portions around the window opening being turned inwardly as shown in Figs. 3 and 4. This turned-in portion may be enlarged or joined with another sheet metal unit to form the lining board 5 which supports the fabric upholstery material 6 and provides a flange for mounting of the sealing member 7. A garnish moulding 8 is secured to the lining board 5 by means of the screw 9, and helps to hold the sealing member 7 in position.

Figure 2:
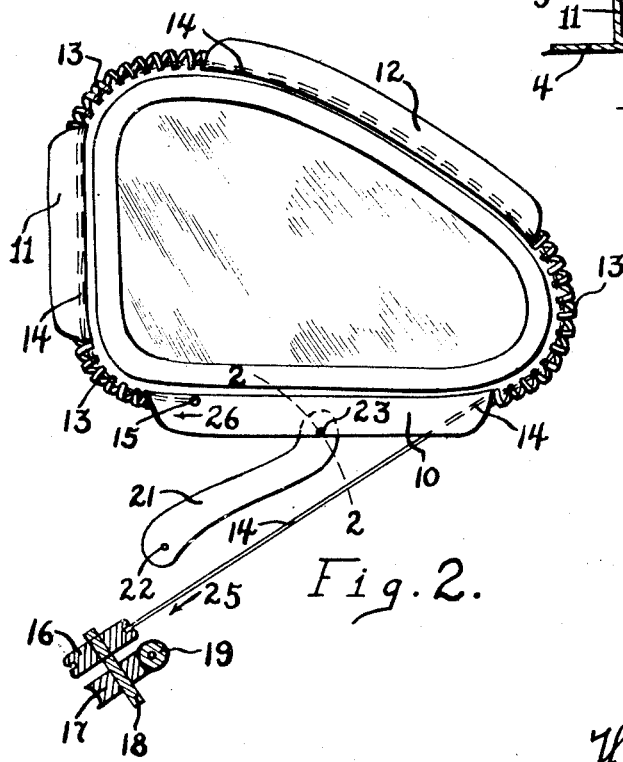
Fig. 2 is an elevational view of the ventilating window together with the operating mechanism.
Figure 5:
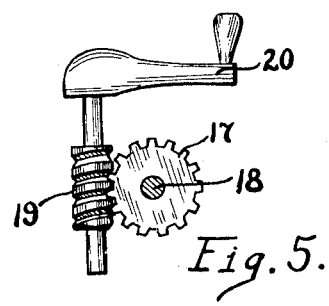
Fig. 5 is an elevational view of the window control mechanism.

In Fig. 2, the operating mechanism is comprised of sheet metal members 10, 11 and 12 which are formed to the contour of the three sides of sash 2. Coil springs 13 are connected to the members 10, 11 and 12 in such a manner as to enclose the corner portions of sash 2. The assembly of the members 10, 11 and 12 together with the coil springs 13 form a tubular unit completely encircling sash 2 and through which wire 14 passes. One end of the piano wire 14 (or fine wire cable), is secured to member 10 at the point designated as 15. The wire 14 extends through the members 11 and 12 as indicated by broken lines 14, also through coil springs 13 which are positioned intermediately between members 10, 11 and 12 and continues through to the opposite end of member 10 and down to the pulley 16. The pulley 16 together with the worm gear 17 is secured to the shaft 18; the worm 19 is controlled by manipulation of the hand crank 20, Fig. 5. The lever 21 has a fixed point 22, and is attached to member 10 at point 23, point 23 being free to move up or down along arc 2—2.

As shown in Fig. 1, the ventilating window comprising glass panel 1 and sash 2 is provided with sufficient clearance 24 to allow said window to swing in or out about the axis of pivots 3. Whenever the occupant of the vehicle desires to completely seal the window by closing in the space 24, he should turn the crank 20 in a clock-wise direction; this would cause the pulley 16 to be driven by the worm 19 and gear 17, exerting a pulling force 25 on wire 14. This force 25 would tend to compress coil springs 13 and exert a pulling force 26 on member 10, causing it to move upward due to the limitations imposed thereon by the lever 21; this would close the space 24 between member 10 and sash 2. The compression of coil springs 13 caused by force 25 would shorten the radii of their respective arcs and close in the space 24 at the corner portions. The members 11 and 12 would also be drawn in by this same force 25, thereby completely closing in the gap 24 around the window panel. The sealing member 7 is composed of sponge rubber or similar substance and insulates the members 10, 11 and 12 together with coil springs 13 against coming into contact with sash 2; said sealing member 7 being forced tightly against sash 2 whenever the pulling force 25 is exerted on wire 14, and making the window weather-proof.

Whenever the occupant desires to swing the window open, a reverse turn of the crank 20 will release the force 25 on wire 14, and the tension of the rubber sealing member 7 will automatically force the various members back into their respective positions as indicated in Fig. 2, which provides the necessary clearance 24 to permit the window to swing freely about the axis of pivots 3.

Having thus described my invention, what I wish to secure by Letters Patent, is:

1. A ventilating window panel having pivots secured to the sash thereof, and mounted to the window frame with sufficient clearance to swing freely about the axis of said pivots; means for sealing the space between said sash and said window frame, comprising; a sealing member having its outer edge portion secured to said window frame and means for constricting its inner edge portion about the periphery of said sash.

2. A ventilating window panel having pivots secured to the sash thereof; said pivots being mounted to the window frame in such a manner as to permit said window panel to swing freely about the axis of said pivots; means for sealing said window panel in a closed position, comprising; a sealing member having its outer edge portion sealed within said window frame, and having normal clearance between said sash to permit free movement thereof; and means for constricting said sealing member about the periphery of said sash.

THOMAS PAUL LOHRMAN.